United States Patent

[11] 3,612,834

[72] Inventors Masakazu Arikawa
Ashiya;
Yasuhiko Nohara, Yokohama, both of Japan

[21] Appl. No. 857,808
[22] Filed Sept. 15, 1969
[45] Patented Oct. 12, 1971

[73] Assignees Mitsubishi Jukogyo Kabushiki Kaisha;
Nihon Doro Kodan
Tokyo, Japan

[32] Priority Oct. 14, 1968
[33] Japan
[31] 43/74512

[54] SIGNAL READOUT METHOD AND APPARATUS
8 Claims, 3 Drawing Figs.

[52] U.S. Cl. ........ 235/61.11 D, 235/61.12 M, 340/146.3 K
[51] Int. Cl. ........ G06k 7/08
[50] Field of Search ........ 235/61.114, 61.12 M, 61.115, 61.12; 194/4, 6; 340/146.3 K; 179/100.2 CA, 100.2 MI

[56] References Cited

UNITED STATES PATENTS

| | | | |
|---|---|---|---|
| 2,899,132 | 8/1959 | Orthuber | 340/146.3 |
| 2,983,354 | 5/1961 | Ember et al. | 235/61.12 |
| 3,067,934 | 12/1962 | Amacher et al. | 235/61.11 |
| 3,171,020 | 2/1965 | Lord | 235/61.12 |

OTHER REFERENCES

IBM Tech. Discl. Bulletin: " Recording Medium," by Brownlow, Vol. 11 No. 3, August 1968, page 238.

*Primary Examiner*—Thomas A. Robinson
*Attorney*—McGlew and Toren

ABSTRACT: A code carrier is in the form of a circular plate comprising concentric metal rings alternating radially with nonmetallic rings. All the rings have substantially the same radial width and preferably substantially the same axial thickness. In accordance with the particular code, certain of the rings are of magnetic metal and certain of the rings are of nonmagnetic metal. The code carrier is passed along a detection path, such as being slid along an aluminum channel. A pair of detectors are positioned along the detection path in alignment with the locus of movement of the center of the code carrier, and are spaced apart longitudinally of the path a distance equal to the radial width of the rings. One of these detectors detects magnetic metal and the other detector detects nonmagnetic metal. The outputs of the two detectors are connected through respective shaping circuits to the two inputs of an AND circuit which provides an output pulse responsive to simultaneous detection of both a magnetic ring and a nonmagnetic metal ring. The nonmagentic metal detector has an output branched therefrom, beyond the respective shaping circuit, and this output provides clock or timing pulses.

PATENTED OCT 12 1971 3,612,834

INVENTORS
MASAKAZU ARIKAWA
YOSUHIKO NOHARA

BY McGlew and Toren
ATTORNEYS

SIGNAL READOUT METHOD AND APPARATUS

BACKGROUND OF THE INVENTION

In a conventional code-reading method, a ray of radiant energy is directed upon one of the surfaces of a code plate of nonmetallic material, such as plastic, having metallic material imbedded therein. A radiant ray, passing through a metallic ring, is detected on the opposite surface of the plate. The variation in the detected radiant energy, resulting from the radiant energy passing through the code plate, is converted into a pulse signal so that the code on the code plate can be read. In a method of this type, as a radiant material is used for reading he code, the operator must have a license to handle radiant material, and locations for operation available to the operator are limited. Furthermore, since the signal code inherent to the respective code plate, and the clock code performing the timing function, are coexistent in the detected radiant energy passing through the code plate, it is necessary to discriminate between the two codes. Practically, however, the sensitivities of the receiving element, amplifier and level setter, or the like, adversely affect the discriminating operation and cause errors. As a result, frequently code reading cannot be carried out properly.

To obviate these difficulties, it has been proposed to provide a code-reading method and apparatus including a code carrier in the form of a circular plate of nonmagnetic material. One surface of this plate carries clock indicia in the form of concentric, uniformly spaced annular bands of magnetic material, and the other surface of this plate carries signal indicia in the form of concentric, selectively spaced, annular bands of magnetic material each opposite a different respective clock indicia. This code carrier is passed along a detection path and, at a detection point on this path, there are arranged two magnetic pickup heads, one operable to scan the upper surface of the plate and the other operable to scan the lower surface of the plate, the two pickup heads being vertically aligned. The outputs of the pickup heads are connected to the two inputs of an AND circuit which provides an output signal pulse responsive to simultaneous detection of a clock indicia and a signal indicia.

While this proposed method and apparatus are generally satisfactory in practice, there are certain disadvantages connected therewith. As different codes are disposed on the front and back surfaces of the plate, the number of concentric annular channels provided for imbedding the magnetic material in one surface is not the same as the number provided in the other surface. Consequently, a greater number of work steps is required in manufacturing the code plate. In addition, the proposed apparatus requires a relatively complicated fixing of magnetic powder or magnetic rings into the channels. It is also necessary to provide, on both sides of the code plate, the signal detectors. Finally, the code plate is easily warped because the pattern on one surface of the code plate differs from that on the other surface.

SUMMARY OF THE INVENTION

This invention relates to code or signal reading and, more particularly, to a novel and improved method and apparatus involving the use of a code carrier comprising concentric metal rings alternating radially with nonmetallic rings and with some of the metal rings being magnetic and others being nonmagnetic in accordance with the particular code.

In accordance with the invention, a code carrier is provided in the form of a circular plate or disc having concentric metal rings imbedded therein in uniformly spaced relation to extend completely between both surfaces of the disc or plate. The disc or plate may comprise, for example, nonmetallic material such as, for example, suitable plastic composition material or synthetic resin, and this material may be provided in the form of concentric uniformly spaced rings alternating with the metal rings. Certain of the rings are formed of magnetic material, and other rings are formed of nonmagnetic material, in accordance with the particular code to be read.

A detection path is provided, preferably in the form of a sloping channel of suitable material such as, for example, aluminum, having an inside width substantially of the order of the diameter of the circular plate or disc. At a location along this detection path, there are provided a first detector for detecting magnetic metal and a second detector for detecting nonmagnetic metal, both detectors being arranged adjacent to the same surface of the channel. The first and second detectors are located on the locus of movement of the center of the plate of disc, and are spaced apart longitudinally a distance equal to the spacing of two consecutive metal rings. The outputs of the detectors are connected to the two inputs of an AND circuit, preferably through respective shaping circuits. The AND circuit input from the second detector is preferably branched to bypass the AND circuit.

The AND circuit provides an output signal pulse responsive to simultaneous detection of a magnetic ring and a nonmagnetic ring. The branch circuit provides a clock pulse responsive to the detection of a nonmagnetic metal ring.

An object of the invention is to provide an improved signal readout method and apparatus obviating the disadvantages of prior art readout methods and apparatus.

Another object of the invention is to provide such a signal readout method and apparatus in which the desired signal code is detected magnetically.

A further object of the invention is to provide such a signal readout method and apparatus using a code carrier in the form of a circular plate or disk comprising concentric metal rings alternating radially with nonmetallic rings, and with some of the rings being magnetic metal and others of the rings being nonmagnetic metal.

Another object of the invention is to provide such a signal readout method and apparatus in which all of the rings have substantially the same radial widths.

A further object of the invention is to provide such a signal readout method and apparatus including a detection path adjacent which are two detectors, one capable of detecting nonmagnetic metal and the other capable of detecting only magnetic metal, with the two detectors being spaced longitudinally of the detection path on the locus of movement of the center of the code carrier by a distance equal to the distance between two successive metal rings.

Another object of the invention is to provide such a signal readout method and apparatus in which the detectors are connected to the inputs of an AND circuit providing an output signal pulse responsive to simultaneous detection of a nonmagnetic metal ring and a magnetic metal ring.

For an understanding of the principles of the invention, reference is made to the following description of a typical embodiment thereof as illustrated in the accompanying drawings.

DESCRIPTION OF THE PREFERRED EMBODIMENT

Figure 1:
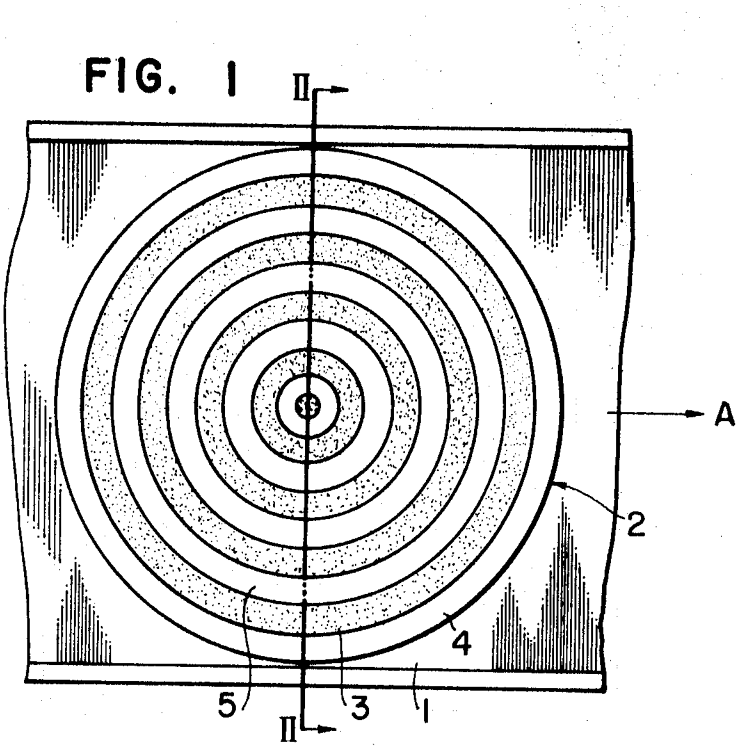
FIG. 1 is a partial plan view of apparatus embodying the invention.
Figures 2A, 2B:
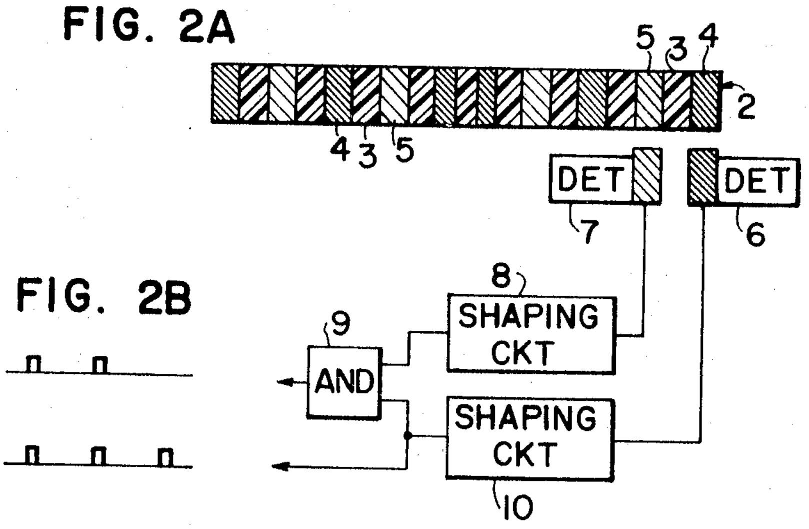
FIG. 2*a* is a somewhat diagrammatic sectional view taken on the line II–II of FIG. 1 and illustrating schematically the detection circuit.
FIG. 2*b* is a graphic illustration of the pulse outputs of the detection circuit.

Referring to FIGS. 1 and 2*a*, a detection path is illustrated as a trough or channel of aluminum or the like having an inside width substantially equal to the diameter of a circular code disc or plate 2. Trough 1 preferably is sloped longitudinally for sliding of disc or plate 2 therealong. Code disc or plate 2 comprises a plurality of concentric uniformly spaced metal rings including nonmagnetic metal rings 4 and magnetic metal rings 5. The metal rings 4 and 5 are separated by rings 3 of nonmagnetic material, and extend from one surface of disc 2 to the other surface of disc 2.

Referring to FIG. 2*a*, a detector 6, such as a proximity switch, which detects only the nonmagnetic metal is illustrated as disposed nearly below the nonmagnetic metallic ring 4. A detector 7, such as a proximity switch, which detects only the magnetic metal is illustrated as disposed, in parallel with proximity switch 6, nearly below the ring 5 adjacent the nonmetallic or plastic ring 3 juxtaposed with the nonmagnetic ring 4 facing proximity switch 6. It will be clear that proximity switches 6 and 7 are spaced by a distance equal to the radial width of plastic ring 3. The detectors 5, 6 and 7 are also located on the locus of movement *A* of the center of disc or plate 2.

Proximity switch 7 is connected to one of the input terminals of an AND circuit 9 through a shaping circuit 8 which shapes the pulse signal from proximity switch 7, and the read signal is applied to proximity switch 7. The output of proximity switch 6 is connected to a shaping circuit 10, and the output of shaping circuit 10 is connected to the other input of AND circuit 9, and also is branched. Shaping circuit 10 shapes the pulse signal from proximity switch 6, and the branch circuit is connected to a clocking circuit, which has not been illustrated.

In the operation of the apparatus, code disc 2 moves along path or through 1 in the direction of arrow *A* at a predetermined speed. Since, on code carrier 2, nonmagnetic metallic rings 4 and magnetic metallic rings 5 are disposed in succession, being separated by a plastic ring 3, proximity switch 6 detects a nonmagnetic metallic ring 4 as a clock pulse signal when this ring is located above switch 6. In this particular example, magnetic metallic ring 5 is located above proximity switch 7, and is detected thereby as a read pulse signal.

The pulse signals thus detected are shaped by shaping circuits 10 and 8, respectively, and applied simultaneously to AND circuit 9. This AND circuit operates only upon receipt simultaneously of signals from both shaping circuits 8 and 10. Thus, AND circuit 9 provides an output signal pulse as shown in FIG. 2*b*.

Since AND circuit 9 provides an output signal pulse only when pulses are applied simultaneously to both its inputs, a correct signal pulse, separated from any noise signal, can be obtained from the output of the AND circuit 9 even if a noise signal is produced at any time during movement of disc or plate 2. During passage of disc 2 over proximity switch 6, the clock or timing signal, the shown in the lower part of FIG. 2*b*, can be obtained successively from the output side of shaping circuit 10 each time the nonmagnetic metallic rings 4 pass over proximity switch 6.

As code disc 2 has both surfaces formed in the same manner, a correct signal can be read out, through the combination of signals from proximity switches 6 and 7, when disc 2 is moved along path 1 and past proximity switches 6 and 7 no matter which surface of the disc is upward during such movement. In joining plate or disc 2, metallic rings 4 and 5 can be provided in the form or concentric uniformly radially spaced cylinders and then integrally molded with the injection of a plastic composition material. The cylinder can then be cut into rings. This greatly facilitates manufacture of the code disc.

Only nonmagnetic metallic rings 4 provide clock signals, with both the nonmagnetic rings 4 and the magnetic metallic rings 5 providing signal pulses when the two different rings are read simultaneously by the proximity switches 6 and 7. Thus, correct reading of the signal, separated from noise, can be realized at all times. As the code disc 2 is constructed in such a manner that the metallic rings 4 and 5 and the plastic rings 3 extend completely through the disc from one surface to the other, warping of the disc is minimized.

The signal readout method and apparatus of the present invention can be used for various applications, such as in automatic machines for receiving toll tickets or tokens, at highway toll booths, for example. Eddy current detecting coils can be used instead of the proximity switches to provide the detectors. The use of eddy current detecting coils makes possible discrimination of the signals, utilizing the fact that the output level differs according to the material used for the metallic ring. It will be apparent that the underlying principles of the invention may be embodied in other ways than those specifically described.

Summarizing, the invention comprises a code disc in which magnetic rings and nonmagnetic metal rings are embedded completely through the disc concentrically at uniform radial spacings. The invention further includes a first detector for detecting magnetic metal and a second detector for detecting nonmagnetic metal, the two detectors being spaced from each other by a distance equal to the distance between two successive metal rings, and being located on the locus of movement of the center of disc 2. Furthermore, an AND circuit is included for receiving signals from the two detectors.

As the shapes of both surfaces of the disc are identical, correct signals can be read out by the detectors no matter which surface faces upwardly. Signals from the nonmagnetic metallic rings are combined with signals from the magnetic and the individual signals are read separately by using two detectors. As a result, the signal can be read correctly and free of interference by noise. The code disc is formed by combining the requisite number of metallic rings and metallic rings, and rings, and thus can be manufactured easily with warping of the code disc being minimized.

As the magnetic and nonmagnetic metallic rings are arranged in the code disc, the signals can be positively separated and there is no fear of misoperation which is unlike the case of a conventional code plate utilizing a radiant energy detection method and in which the code plate is formed by unitary code rings. In comparison with a device using radiant energy, the device of the invention is operated on a magnetic principle. Thus, the invention apparatus can be handled by personnel not qualified for handling of irradiated material, and is metallic rings, and limited as the location of installation.

While a specific embodiment of the invention has been shown and described in detail to illustrate the application of the principles of the invention, it will be understood that the invention may be embodied otherwise without departing from such principles.

We claim

1. A signal readout method comprising the steps of providing a code carrier in the form of a plate having substantially identical opposite surfaces composed of metal strips alternating with nonmetallic strips, all of the metal strips being located identically on both surfaces and having substantially the same lateral spacing from each other, with some of the metal strips being magnetic and others being nonmagnetic, and the metal strips constituting code indicia; passing the code carrier along a detection path; separately and contactlessly scanning the magnetic and nonmagnetic strips on only one such surface at two respective points on the path centered on the locus of movement of the center of the code carrier and spaced apart by the spacing of the metal strips; and, responsive to simultaneous detection of a magnetic strip and a nonmagnetic strip, providing an output pulse corresponding to the detected code indicia.

2. A signal readout method, as claimed in claim 1, in which the code carrier is provided in the form of a circular plate composed of concentric metal rings alternating radially with nonmetallic rings, with all of the metal rings having substantially the same radial spacing; scanning of the magnetic and nonmagnetic rings being effected at two points centered on the locus of movement of the center of the code carrier and spaced apart by the radial spacing of the metal rings.

3. A signal readout method, as claimed in claim 2, including the step of, responsive to detection of each nonmagnetic ring, providing an output clock pulse.

4. A signal readout apparatus comprising, in combination, a code carrier in the form of a plate having substantially identical opposite surfaces comprising metal strips alternating transversely with nonmetallic strips, all of the metal strips being located identically on both surfaces and having substantially the same lateral spacing with some of the metal strips being magnetic and the others being nonmagnetic, and the metal strips constituting code indicia; means providing a detection path along which the code carrier is passed; a first detector operable to detect magnetic metal contactlessly; a second detector operable to detect a nonmagnetic metal contactlessly; said first and second detectors being spaced from each other along said path by the lateral spacing of said strips and being centered on the locus of movement of the center of the code carrier; both detectors being positioned adjacent the same surface of a code carrier on said path; and an AND circuit having its inputs connected to the outputs of both detectors.

5. Signal readout apparatus, as claimed in claim 7, in which said code carrier is in the form of a circular plate comprising concentric metal rings alternating radially with nonmetallic rings and with all of the metal rings having substantially the same radial spacing from each other; said first and second detectors being spaced from each other by the radial spacing of said metal rings.

6. A signal readout apparatus, as claimed in claim 5, in which said detectors are proximity switches.

7. A signal readout apparatus, as claimed in claim 5, in which said detectors are eddy current pickup windings.

8. A signal readout apparatus, s claimed in claim 5, including a branch circuit extending from said second detector and providing clock pulses responsive to detection of a nonmagnetic metal ring.